(12) United States Patent
Rimondi et al.

(10) Patent No.: US 7,264,884 B2
(45) Date of Patent: Sep. 4, 2007

(54) BARRIER STRETCH FILM PARTICULARLY FOR THE PACKAGING OF FOOD PRODUCTS AND METHOD FOR THE PRODUCTION THEREOF

(75) Inventors: Renato Rimondi, Bazzano (IT); Angelo Cappi, Vignola (IT); Carlo Nicoletti, Vignola (IT)

(73) Assignee: A.W.A.X. Progettazione e Ricerca (IT)

( * ) Notice: Subject to any disclaimer, the term of this patent is extended or adjusted under 35 U.S.C. 154(b) by 8 days.

(21) Appl. No.: 10/451,423

(22) PCT Filed: Dec. 21, 2001

(86) PCT No.: PCT/EP01/15250

§ 371 (c)(1), (2), (4) Date: Jun. 23, 2003

(87) PCT Pub. No.: WO02/053377

PCT Pub. Date: Jul. 11, 2002

(65) Prior Publication Data

US 2004/0052991 A1 Mar. 18, 2004

(30) Foreign Application Priority Data

Dec. 29, 2000 (IT) .................... GE2000A0143

(51) Int. Cl.
*B32B 27/30* (2006.01)

(52) U.S. Cl. ............. 428/520; 264/173.12; 264/173.14; 264/173.15; 428/35.4; 428/36.6; 428/36.7; 428/516; 428/522; 428/910

(58) Field of Classification Search ............ 264/173.14, 264/173.15, 173.12; 428/35.4, 36.6, 36.7, 428/516, 520, 522, 910

See application file for complete search history.

(56) References Cited

U.S. PATENT DOCUMENTS

| | | | | |
|---|---|---|---|---|
| 4,552,801 A | * | 11/1985 | Odorzynski et al. | ........ 428/220 |
| 4,611,019 A | | 9/1986 | Lutzmann et al. | |
| 5,318,829 A | | 6/1994 | Tada et al. | |
| 5,759,648 A | * | 6/1998 | Idlas | ........................ 428/34.9 |
| 2004/0048986 A1 | | 3/2004 | Shimo et al. | |

FOREIGN PATENT DOCUMENTS

| | | |
|---|---|---|
| EP | 0 144 239 | 6/1985 |
| EP | 0 333 443 | 9/1989 |
| EP | 0 932 550 | 8/1999 |
| EP | 1 059 163 | 12/2000 |
| LU | 88839 | 2/1997 |

* cited by examiner

*Primary Examiner*—D. S. Nakarani
(74) *Attorney, Agent, or Firm*—Stites & Harbison PLLC; Marvin Petry

(57) ABSTRACT

A stretch film presenting controlled permeability to gases, manufactured by process of balloon co-extrusion and consisting of outer layers (S2) of stretchable polmeric material and by one or two inner barrier layers (S3) of a EVOH based polymeric matrix, which is made stretchable by the addition of a suitable plasticizer in such a percentage as to conciliate the stretchablity with the desired barrier effect, said layers of different material being reciprocally secured by means of layers (S4) of adhesive material. The polymeric matrix which forms the barrier material and the plasticizer are intimately mixed inside a double-screw corotating extruder, immediately before the phase of co-extrusion, through a premelting of the polymeric matrix and the subsequent injection of the plasticizer in liquid phase.

2 Claims, 2 Drawing Sheets

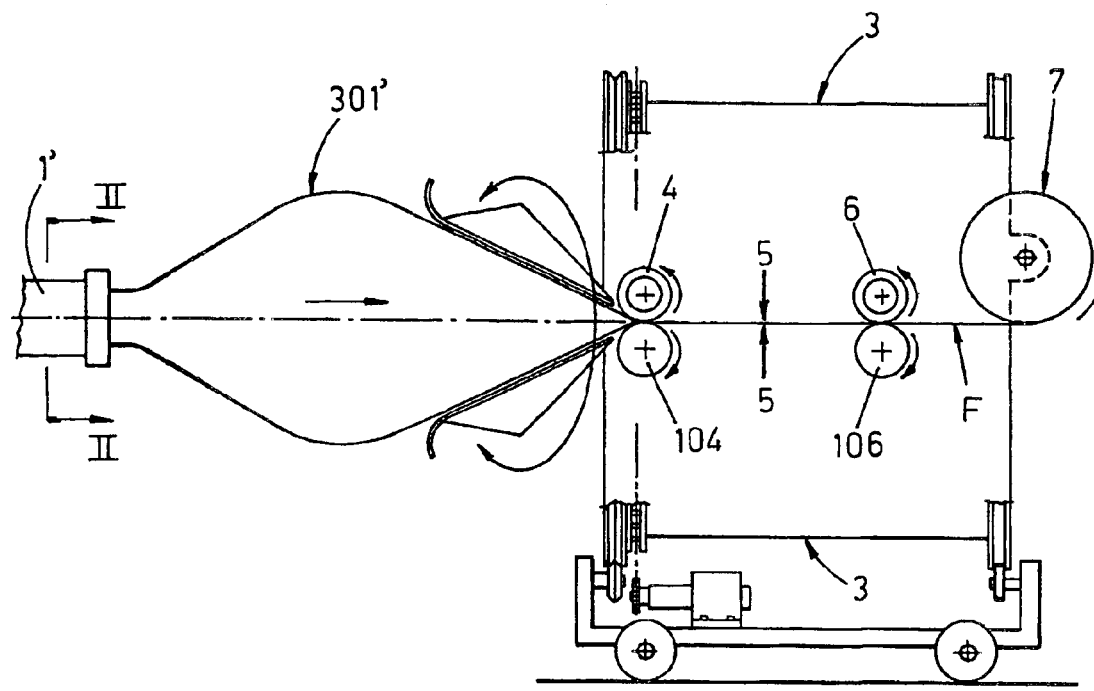
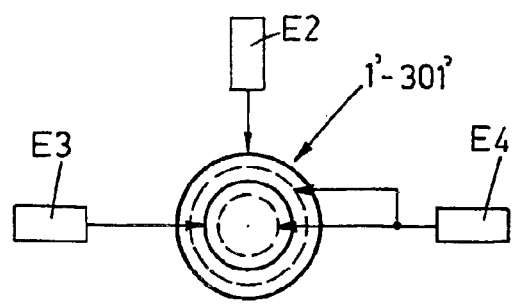
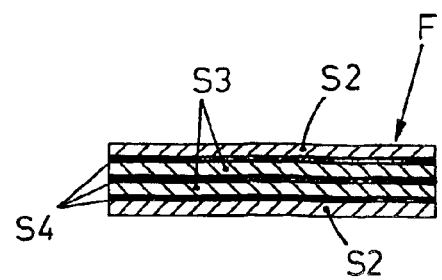
Fig. 2
Fig. 2a
Fig. 2b

BARRIER STRETCH FILM PARTICULARLY FOR THE PACKAGING OF FOOD PRODUCTS AND METHOD FOR THE PRODUCTION THEREOF

The present invention relates to stretch films particularly for the packaging of food products and more particularly it relates to a stretch film for the packaging of food products in a modified atmosphere and provided with a barrier presenting controlled permeability to gases, so as to ensure a time prolonged preservation of the packaged goods.

In the field of packaging of food products it is known, as in the case of portioned fresh meat, the use of stretch film in order to obtain a protective wrapping, which represents simply a barrier to the surface contamination subsequent to the packaging and which is not capable of preventing the degradative development of the packaged product.

In order to prolong the preservation of the packaged products, by preventing or limiting in a significant manner the microbic development and by partially rendering inactive the enzymatic processes, there is used the technology of packaging in protective atmosphere, by employing the so-called barrier films, which are substantially impermeable to gases. However, the known materials having the property of preventing the permeation of gases, present also the characteristic of not being stretchable, or of not being stretchable to a sufficient degree, which fact precludes the flexibility of use which is typical of the stretch film employed for the packaging of food products.

According to document EP 0 932 550 there is contemplated the use of films presenting high stretchability and sealability for the packaging of food products, so as to obtain closed packages with a tight seal, inside which there is created, at the moment of their formation at the interior of a controlled atmosphere chamber, a modified atmosphere such as to guarantee a preservation more accurate and prolonged in time of the packaged product.

From the present state of the art there is known the barrier stretch film described in document EP 0 333 443, which comprises a multi-layer film formed by outer layers of heat sealable polymeric material, by a first pair of inner layers of an oxygen barrier polymeric material, by a second pair of inner layers of a high molecular weight polymeric material, by a third pair of inner layers copolyamide based, and which comprises layers of polymeric adhesive between said second and said third pairs of inner layers, said multi-layer film being made as a tubular film and its interior surface being self-sealing. For the realisation of the inner layers of polymeric material having characteristics of a high gas barrier there are cited both copolymers ethylene vinyl alcohol copolymer (EVOH) and polyvinylidene chloride copolymer (PVDC).

According to said document there is made preference for the use of the PVDC manufactured as "Saran" by Solvay, due to the relative minor sensibility to humidity of this copolymer with respect to EVOH.

Particularly, for the uses for which this type of film is proposed, where a high gas barrier is requested, the employ of not plasticized Saran is suggested, since the possible plasticization, mentioned in generic terms, although it confers to the copolymer a greater flexibility, prejudices the desired characteristics of high barrier to gases.

The present invention intends to obviate the limits of the known art by proposing a multi-layer film particularly adapted for the packaging of food products, which is able to conciliate the requirement of a high stretchability and of an impermeability to gases, suitable for the product to be packaged, and which is characterised by comprising at least one barrier layer consisting of a polymeric matrix substantially impermeable to gases, EVOH-based, which is rendered stretchable by adding a suitable plasticizing material, said barrier layer being enclosed between at least two layers of a film of stretchable polymeric material. Differently from the PVDC of the known art, the plasticized EVOH according to the present invention is provided with the required stretchability and at the same time it maintains a high barrier to gases. Advantageously there is used a composite film provided with a multiple barrier layer, for example double, with the barrier layers united between them and to the outer layers by means of layers of adhesive material, in such a manner that the flexibility of the multi-layer structure thus obtained, is such that during the phase of stretching of the film, the two barrier layers behave in a solidary manner, substantially without reciprocal slips, giving origin to a reciprocal compensation, guaranteeing uniformity of thickness of the stretched film and a gas barrier which is suitable for the mentioned scopes.

According to the present invention, the barrier layer consists of EVOH with the addition of a plasticizer the percentage of which can vary from a minimum to a maximum value, for example from 5 to 30% depending upon the packaging requirements. This possibility of variation of the percentage of plasticizer consents the modulation of both the permeability of the layer as a function of the tightness which the packaging film must confer to a determined food product, and the degree of stretchability of the said barrier layer. For each product to be packaged it will be therefore possible to select the combination of permeability/stretchability of the barrier film of films which is more apt to guarantee the better conditions for the preservation of the said product.

The outer layers of stretchable material and the adhesive layers are preferably polyolefinic based and/or other base such as to offer the best protection against moisture to the layers of copolymer EVOH plasticized, so that even under high relative humidity conditions there is not compromise in the characteristics of a high barrier to the gases of the multi-layer film according to the invention.

The multi-layer film according to the invention is preferably produced by means of a process of balloon co-extrusion of the layers of stretch material, of barrier material and of adhesive material, in accordance with the method described in document LU 88839 to form a film of several layers glued the one to the other. Thanks to a correct balance between the transverse drawing, caused by the balloon inflation and the longitudinal drawing, determined by the pull of the presser rolls which close the balloon, in relation with the gap of the extrusion head, there are determined the orientation of the material and the performances of the resulting film. Particularly, the gas barrier property is definitely fixed following to the drawing of the film in the product packaging machines, which causes an increase of the degree of crystallinity of the material, due to a molecular re-alignment, which implies a more orderly distribution with the consequent effect of a reduction of permeability to gases of the film itself.

Further scopes and advantages of the present invention will appear better evident from the following description made with reference to the attached drawings, in which:

FIG. 2 is a diagrammatic view of a plant for the manufacture of the multi-layer film according to the invention, provided with seven layers comprehensive of two barrier layers;

FIG. 2a shows diagrammatically details of the co-extrusion head of the plant of FIG. 2, sectioned along line II—II and connected to the injections extruders of the various layers of materials;

FIG. 2b shows in transverse section the seven-layer film produced by the plant of FIG. 2.

Figure 1:
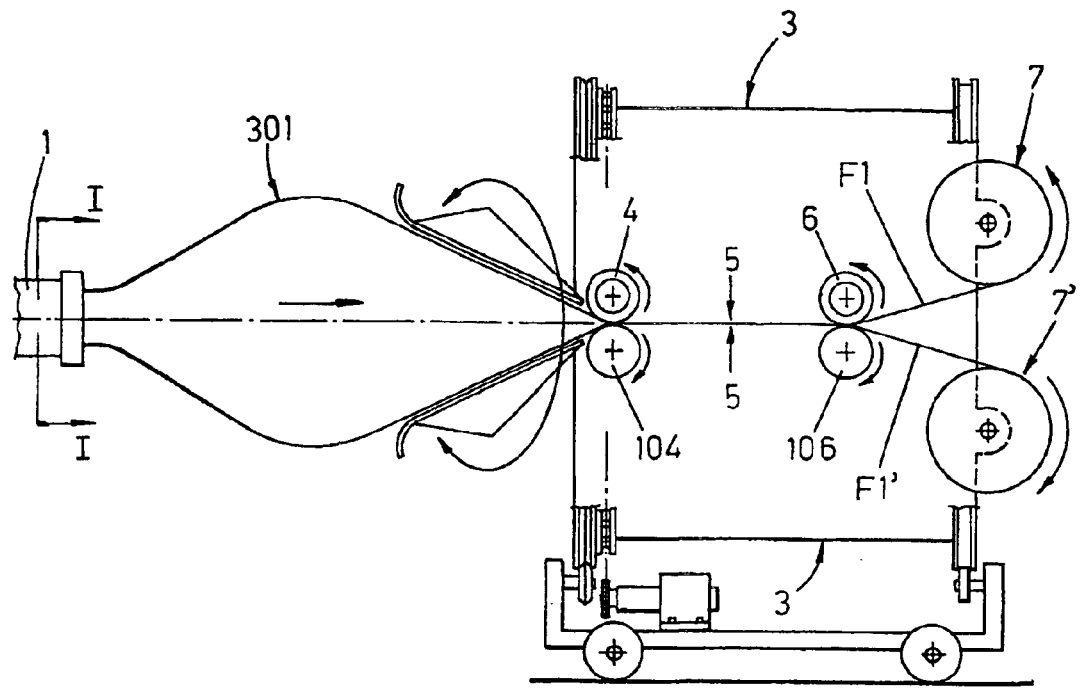
FIG. 1 is a diagrammatic view of a plant for the manufacture of the multi-layer film according to the invention, provided with five layers comprehensive of a single barrier layer.

Hereafter it is indicated by way of non-limiting example, the chemical specification of a barrier layer according to the invention, which layer was subjected to a test of permeability to oxygen under predetermined conditions.

Chemical Specification of the Barrier Layer.

Polymeric matrix: ethylene vinyl alcohol copolymer (EVOH) having the general formula:

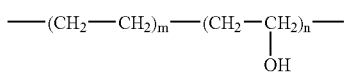

in which "m"(ethylene contents)=27–47 mol %.

Plasticizer: It is preferably selected in the class of the diols and triols having low molecular weight, with the possible presence of an etheric bond. As an example of a suitable plasticizer there is cited propylene glycol (1,2-propanediol) having as general formula:

$C_3H_8O_2$

Other plasticizers which can be used can be butanediol, propanetriol or glycerol or pentanediol.

The intimate mixing between EVOH and the plasticizer is performed inside an extruder of double-screw, co-rotating type, immediately before the co-extrusion process, through a pre-melting of the polymeric matrix EVOH and the consequent injection of the liquid plasticizer which, by homogenous dispersion between the chains of the polymer, reduces in a sensible manner its intermolecular strength.

The temperature profile during this phase is such as to avoid the evaporation of the plasticizer and, consequently, the plasticization of the polymeric matrix EVOH is exactly defined and such as to ensure the stability of the final product during time.

The temperature profile is correlated to the percentage of the plasticizer employed, and with a plasticization of ten percent with propylene glycol, it is of the type indicated in the following table:

| T1 | T2 | T3 | T4 | T5 | T6 | T7 | T8 | T9 | T10 | T11 | T12 |
|---|---|---|---|---|---|---|---|---|---|---|---|
| 210 | 210 | 200 | 190 | 185 | 180 | 180 | 180 | 180 | 180 | 180 | 180 |

The resulting product, although it maintains an excellent barrier action to the gases, aromas and flavours, typical of the base polymer EVOH, acquires improved optical properties, gloss and transparency, together with a high stretchability.

From the calorimetric investigation it appears that the vitreous transition temperature (Tg) decreases in a determining manner with respect to the EVOH as such and this decrease, which is the more remarkable, the higher is the percentage of plasticizer introduced, consents to the final film to be subjected to extensions of remarkable entity (up to 150%) at ordinary temperatures.

The possibility of modulating the percentage of plasticizer, preferably between 5 and 30% consents to obtain films characterised by a different permeability to gases (which is the lesser, as the lesser is the degree of plasticization) together with a different stretchability (which is the higher as the higher is the degree of plasticization).

In the following table there are indicated some data of permeability to oxygen for a test piece consisting of the above described barrier layer, with a thickness of 20 microns and tested under the conditions hereafter indicated:

T=23° C., 0% R.H. (ASTM D1434)

TABLE 1

| Tested test-piece referred to a thickness of 20 microns | Permeability to $O_2$ $cc/m^2 \times 24\,h \times atm.$ |
|---|---|
| EVOH not plasticized | 2.5 |
| EVOH plasticized at 5% with propylene glycol | 4.0 |
| EVOH plasticized at 10% with propylene glycol | 5.5 |
| EVOH plasticized at 15% with propylene glycol | 7.0 |
| EVOH plasticized at 20% with propylene glycol | 9.0 |

Based on these considerations it is possible to find the best combination of the two parameters (permeability to gases/stretchability) which better responds to the packaging requirements of a determined product.

Concerning the structure of the stretch film with barrier effect, particularly for the packaging of food products according to the present invention, we give some non-limiting examples of realisation of said structures.

EXAMPLE 1

Structure with a Single Barrier Layer

In this particular structure we have a sequence of layers constituting the packaging film diagrammatically listed hereafter:

| Outer layer | Adhesive | Barrier layer | Adhesive | Inner layer |
|---|---|---|---|---|

The outer and inner layer define respectively the outer face and the inner face of the co-extruded balloon for the formation of the multi-layer film, which balloon is thereafter squeezed and then divided in two parts which are collected separately (see after). It is to be understood that the layer previously defined as "inner", actually is an outer layer inasmuch as it defines an outer face of the multi-layer film according to the invention.

EXAMPLE 2

Structure with a Double Barrier Layer

| Outer layer | Adhesive | Barrier layer | Adhesive | Barrier layer | Adhesive | Outer layer |
|---|---|---|---|---|---|---|

As in the preceding example, the outer layers represent the outer faces of the co-extrusion balloon of the multi-layer film according to the invention (see after), which is squeezed to form a single film which is collected singularly.

The outer and inner layers of Example 1 and the outer layers of Example 2 are made of materials presenting high stretchability and sealability, for example by materials having a polyolefin base.

Adhesive layers: The adhesive layers are made for example of materials having a polyolefin base, modified by the addition of functional polar groups, such as maleic anhydride.

The structure presenting a double barrier layer is the one which is better suitable for solving all the technical problems connected with the present invention. The materials which compose the outer stretchable layers and the adhesive layers, are as mentioned of a polyolefin base e present a high impermeability to the water vapour, so that they offer the best protection against humidity to the EVOH based barrier layers, so that even in the presence of high values of relative humidity, the characteristics of high barrier to the gases of the multi-layer film according to the invention are not compromised.

With reference to FIGS. 1, 1a, 1b, 2, 2a, 2b of the two attached sheets of drawings, the process is now described for the production on industrial scale of the stretchable and barrier multi-layer film according to the above mentioned Examples 1 and 2, which foresees the use of the machine described in document LU 88839.

Figure 1A:
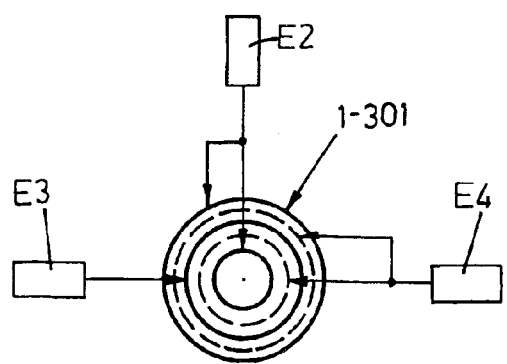
FIG. 1a shows diagrammatically details of the co-extrusion head of the plant of FIG. 1, sectioned along line I—I and connected to the injections extruders of the various layers of materials.

In FIGS. 1 and 1a, reference numeral 1 indicates a co-extrusion die head to which there are fed by three extruders indicated by references E2, E3 and E4 respectively the inner and outer layer of stretchable material, the intermediate layer of barrier material and the two layers of adhesive material, arranged between the two stretchable layers and the barrier layers in order to unite them intimately. The tubular balloon 301 which comes out of the co-extrusion head 1 and which is formed by the five layers of above mentioned materials is handled by manipulator means mounted on a frame 3 which rotates slowly first in one direction and then in the other direction, about an axis horizontal and aligned to the axis of the said head, and which means comprise in succession:

- a first driven pair of parallel drawing rollers 4, 104 which squeeze and render flat the said film balloon 301, so as to form two superposed films F1 and F1', each one comprising five layers as from the above said Example 1, which are in reciprocal contact by the inner layer of stretchable film;
- cutting means 5 which separate from the two superposed films the relating longitudinal connecting edges. Suitable means not shown are provided for discarding the off-cuts resulting from the cutting operation;
- a second driven pair of parallel rollers 6, 106 which operate at a speed which is suitable greater than the one of the said first pair of drawing rollers, in order to subject the said films to a suitable longitudinal stretch and to maintain them in the best condition of co-operation with said cutting means;
- winding means for the winding into bobbins of the five-layer films F1 and F1'.

Figure 1B:
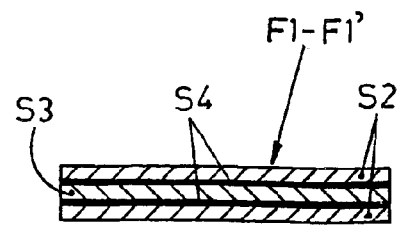
FIG. 1b shows in transverse section the multi-layer film produced by the plant of FIG. 1.

FIG. 1b shows in section one of the five-layer films F1, F1' produced by the process according to FIG. 1 and 1a, and comprises outer layers S2 of stretchable material, an inner layer S3 of barrier material and intermediate layers S4 of adhesive material.

In FIGS. 2, 2a there is instead illustrated the process for the production of the seven-layer film in accordance with Example 2. The three extruders E2, E3 and E4 as in the preceding embodiment, feed to the co-extrusion head 1' respectively the outer layer of stretchable material, the intermediate layer of barrier material and the two layers of adhesive material arranged respectively between the two above mentioned layers and at the interior, so as to form the inner wall of the balloon 301' which comes out of the same head. When the balloon 301' passes through the first pair of parallel drawing rollers 4, 104, It is squeezed and thanks to the presence of the inner layer of adhesive material, the two portions of the said balloon adhere intimately the one to the other so as to form a single film having seven layers and a double barrier layer, with outer layers of stretchable material as from the above said Example 2. The film is further stretched by the second pair of drawing rollers 6,106, it is deprived of the longitudinal edges by the cutting means 5 and is finally collected onto a single bobbin 7. From FIG. 2b it appears that film F is composed of outer layers S2 of stretchable material, of two inner layers S3 of barrier material and of three intermediate layers S4 of adhesive material, of which the central layer is double.

It is to be understood the description was referred to some preferred embodiments of the invention, to which there can be made many variations and modifications, particularly in the construction, the whole however without departing from the leading principle of the invention, as above described, illustrated and claimed hereinafter.

What is claimed is:

1. A process for the manufacture of a multi-layer film which is stretchable and presents a controlled permeability to gases, said process comprising:

mixing barrier material comprising an ethylene vinyl alcohol copolymer and plasticizer material inside a double-screw co-rotating extruder immediately before co-extrusion, said mixing comprising pre-melting a polymeric matrix of the barrier material and subsequent injecting the plasticizer material in a liquid phase to the pre-melted polymeric matrix to thereby form plasticized barrier material in a liquid phase to the pre-melted polymeric matrix to thereby form plasticized barrier material, the polymeric matrix having a profile of a plasticization temperature which varies as a function of the percentage of added plasticizer, injecting of the plasticizer occurs at temperature levels which are lower than the relative evaporation temperature of the plasticizer, and if the EVOH polymeric matrix is plasticized at 10% with propylene glycol, the pre-melting of the matrix starts at about 210° C., and the plasticizer is injected at about 180° C.;

balloon co-extruding a polymeric stretch material, the plasticized barrier material and an adhesive material fed by respective extruders, said material being arranged so as to form layers of an outer annular layer and an inner annular layer of polymeric stretch material, an intermediate annular layer of plasticized barrier material and annular layers of adhesive material interposed between the preceding layers;

squeezing and longitudinal stretching of the balloon by means of a first and of a second pair of parallel and superposed rollers; and cutting and discarding the two longitudinal edges which reciprocally connect the superposed portions of the balloon so as to obtain two films which can be separated, this being performed on the film while under tension, between said two pairs of rollers to form two five-layer films; and separately collecting the two five-layer films obtained;

wherein said longitudinal stretching, longitudinal cutting and collecting of the film is obtained on a structure capable of alternately rotating of about 360° around the axis of the balloon.

2. A process for the manufacture of a multi-layer film which is stretchable and presents a controlled permeability to gases, according to claim 1, said process comprising:

mixing barrier material and plasticizer material inside a double-screw co-rotating extruder immediately before co-extrusion, said mixing comprising pre-melting a polymeric matrix of the barrier material and subsequent injecting the plasticizer material in a liquid phase to the pre-melted polymeric matrix to thereby form plasticized barrier material, the polymeric matrix having a profile of a plasticization temperature which varies as a function of the percentage of added plasticizer, injecting of the plasticizer occurs at temperature levels which are lower than the relative evaporation temperature of the plasticizer, and if the EVOH polymeric matrix is plasticized at 10% with propylene glycol, the pre-melting of the matrix starts at about 210° C., and the plasticizer is injected at about 180° C.;

balloon co-extruding the polymeric stretch material, a plasticized barrier material and an adhesive material fed by respective extruders, said layers being arranged so as to form layers of an outer annular layer of polymeric stretch material, an intermediate annular layer of plasticized barrier material and two annular layers of adhesive material the first one internal and the other one interposed between the two preceding layers, thereby forming a balloon having four layers;

squeezing and longitudinal stretching of the balloon by means of a first and of a second pair of parallel and superposed rollers, so as to obtain a seven-layer film;

wherein the respective internal adhesive layers of the balloon come together to form a single adhesive layer;

cutting and discarding of the two longitudinal edges of the obtained seven-layer film, this being performed on the film while under tension between the said two pairs of rollers; and collecting the seven-layer film;

wherein said longitudinal stretching, of longitudinal cutting and collecting of the film is obtained on a structure capable of alternately rotating of about 360° around the axis of the balloon.

* * * * *